UNITED STATES PATENT OFFICE.

FRANZ KOEGLER AND ANTHONY GOTH, OF BETHLEHEM, PENNSYLVANIA.

IMPROVEMENT IN WATER-PROOF PIGMENTS.

Specification forming part of Letters Patent No. 149,136, dated March 31, 1874; application filed March 18, 1874.

*To all whom it may concern:*

Be it known that we, FRANZ KOEGLER and ANTHONY GOTH, both of Bethlehem, in the State of Pennsylvania, have invented a new and useful Water-Proof Pigment for Coloring and Gilding Textile Fabrics; and we do hereby declare the following to be a full, clear, and precise description of the same, its uses, and the method by which it is compounded.

Our invention consists of a permanent, opaque, water-proof pigment for coloring or gilding textile fabrics, such as canvas, gunny-bagging, sail-cloth, or the like, and is compounded of gum-turpentine, benzine, india-rubber, and a coloring matter.

It is impressed upon the fabric by stamping, painting, or printing, and may be applied in any design desired.

For the better information of the public, we will proceed to describe the method by which we compound our pigment.

We first take thirty pounds of gum-turpentine and melt it at a temperature of about 212° Fahrenheit. We then take and boil ten gallons of benzine. We then mix and stir well together the melted turpentine and benzine, and add to them and grind with them pigment of any desired shade of color, and in the requisite quantity. The compound mixture thus formed we will, for convenience, call "A."

We now take and dissolve two and a half ounces of india-rubber or gum-caoutchouc in one gallon of benzine, and the compound thus produced we will call "B."

We now take one gallon of the mixture A, and add to it, and thin it with, one gallon of the mixture B; and the compound resulting from this last mixture is the pigment which we have invented, ready for use. Of course, we do not limit ourselves to the exact proportions above given, but vary somewhat, according to the absorbative and evaporative powers of the coloring matter used, or the fabric to which it is to be applied.

We add below a table of convenient proportions in forming the colors specified; to vary the tints the proportions must be also varied.

White.—Ten pounds oxide of zinc; nine pounds gum-turpentine; seven and one-half ounces india-rubber; five gallons benzine.

White.—Ten pounds white lead; six pounds gum-turpentine; five ounces india-rubber; three and one-half gallons benzine.

Red.—Ten pounds vermilion, venetian or india red; six pounds gum-turpentine; five ounces india-rubber; three and one-half gallons benzine.

Blue.—Ten pounds ultramarine or cobalt blue; six pounds gum-turpentine; five ounces india-rubber; three and one-half gallons benzine.

Green.—Ten pounds chrome-green; four and one-half pounds gum-turpentine; three and one-fourth ounces india-rubber; two and one-half gallons benzine.

Black.—Ten pounds drop-black; eight pounds gum-turpentine; six and three-fourths ounces india-rubber; four and one-half gallons benzine.

Gilt.—Ten pounds bronze-powder; ten pounds gum-turpentine; ten ounces india-rubber; five gallons benzine.

Yellow.—Ten pounds chrome or ocher yellow; six pounds gum-turpentine; five ounces india-rubber; three and one-half gallons benzine.

Having thus fully described our invention, what we claim, and desire to secure by Letters Patent of the United States, is—

A pigment for coloring and gilding fabrics, compounded of gum-turpentine, benzine, india-rubber, and a coloring or gilding matter, substantially as described.

FRANZ KOEGLER.
ANTHONY GOTH.

Witnesses:
HERMAN GOTH,
MINTHORN DISSOSWAY.